July 14, 1931. L. J. SCHUBERT 1,813,964
VENTILATOR FOR MILK CANS
Filed Oct. 8, 1929
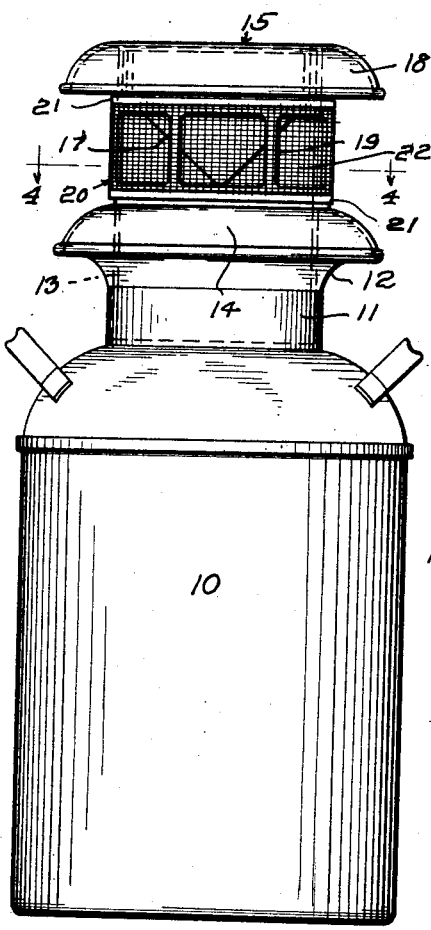
Fig. 1.
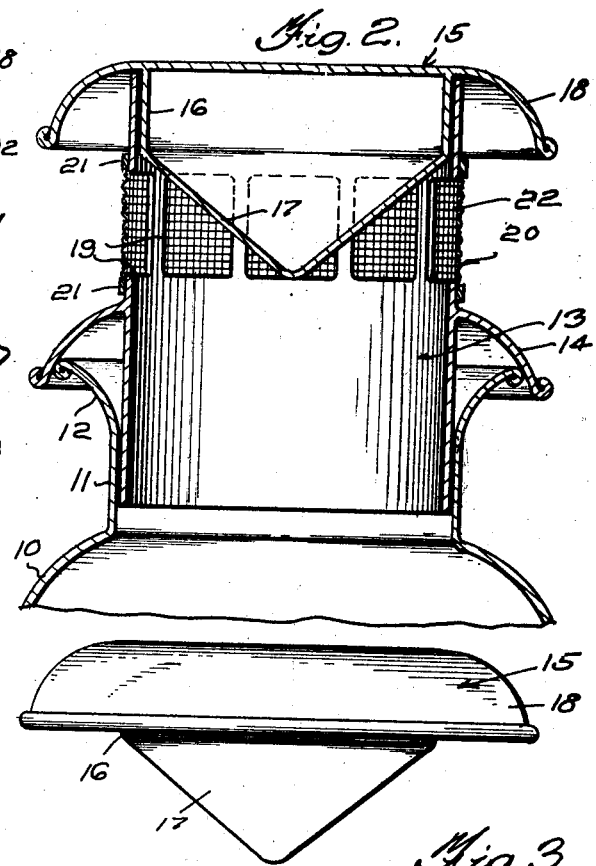
Fig. 2.
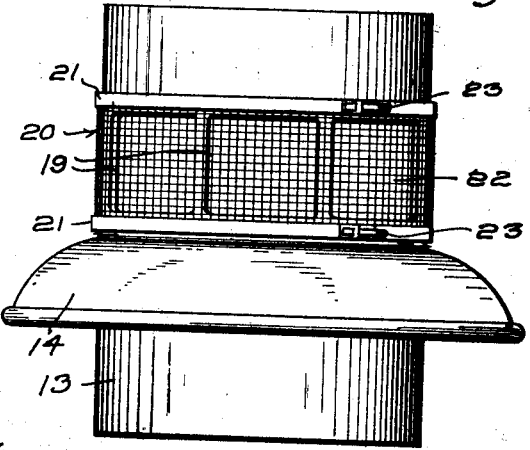
Fig. 3.
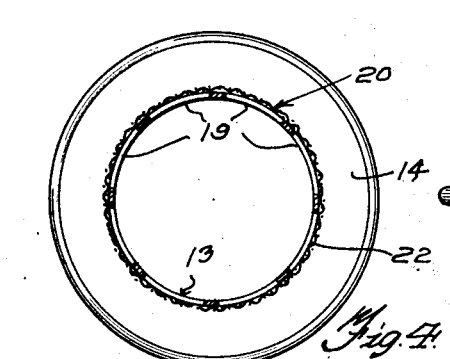
Fig. 4.
Fig. 5.
INVENTOR.
L. J. SCHUBERT,
BY
ATTORNEY.

Patented July 14, 1931

1,813,964

UNITED STATES PATENT OFFICE

LAWRENCE J. SCHUBERT, OF MADISON, WISCONSIN

VENTILATOR FOR MILK CANS

Application filed October 8, 1929. Serial No. 398,216.

My invention relates to a cover device for milk cans.

In accordance with my invention, I provide a cover device which is adapted to be mounted upon the mouth of a milk can, and will provide proper ventilation for the milk, allowing of the escape of animal heat and odor. The device will exclude insects and afford proper ventilation of air above the mouth of the can, aiding in cooling the milk. The device will prevent rain from entering the milk can. The device embodies a cover element which is readily removable from the body portion of the same so that the milk may be conveniently stirred or agitated. The screen element is preferably mounted upon the exterior of the body portion of the device, and is readily removable so that it may be cleaned.

In the accompanying drawings, forming a part of this specification, and in which like numerals are employed to designate like parts throughout the same, Figure 1 is a side elevation of a cover device embodying my invention, showing the same in use, Figure 2 is a central vertical section through the same, Figure 3 is a side elevation of the cover device removed, Figure 4 is a horizontal section taken on line 4—4 of Figure 1, and, Figure 5 is a side elevation of the screen element removed.

In the drawings, wherein for the purpose of illustration, is shown a preferred embodiment of my invention, the numeral 10 designates a milk can having a reduced neck 11 and an outwardly flaring mouth 12.

The cover device embodies a cylindrical body portion 13, the lower end of which is adapted to be snugly inserted into the neck 11. This body portion carries an outwardly projecting annular guard 14, rigidly secured thereto. This guard is inclined downwardly and is preferably spherically curved. The guard 13 has a diameter larger than the lip 12 and is adapted to receive the lip therein and to extend below the lip. The guard 14 forms with the lip a joint, which prevents rain from entering the lip 12 and passing between the neck 11 and body portion 13.

The numeral 15 designates a cover element, having a cylindrical body portion 16 depending therefrom and rigidly secured thereto. Preferably formed integral with the cylindrical body portion 16 is a downwardly tapering cone 17. The body portion 16 is adapted to fit snugly within the upper end of the cylindrical body portion 13 and the deflecting cone projects downwardly into the cylindrical body portion, as shown. Formed integral with the cover element 15 is a radially projecting guard 18, which is inclined downwardly and preferably spherically curved. The guard 18 is preferably of the same diameter as the guard 14.

The body portion 13 is provided with an annular set of ventilating openings 19, formed in its side and arranged between the guards 14 and 18, as shown. The deflecting cone 17 extends downwardly across the openings 19, preferably throughout the entire vertical dimensions of the same.

The numeral 20 designates a strainer element embodying longitudinal straps 21 attached to a section of foraminous material 22, which may be a wire mesh. The strainer element is applied to the exterior of the cylindrical body portion 13 and covers the ventilating openings 19. The ends of the straps 21 are detachably connected by buckles 23 or the like. By arranging the strainer element upon the exterior of the body portion 13 it may be readily removed therefrom for the purpose of cleaning the same, or for the purpose of repair.

With the parts assembled, as shown in Figures 1 and 3, the animal heat and odors from the milk pass upwardly through the cylindrical body portion 13 and encounter the deflecting cone 17 and are guided laterally by the same and discharge through the screen covered opening 19. The guard 14 prevents the passage of rain into the neck 12 and the guard 18 prevents the passage of rain through the screen openings. The screen element prevents insects or the like entering the body portion 13. When it is desired to stir the milk, the cover element 15 may be readily removed so that access may be had to the interior of the can 10.

It is to be understood that the form of my invention, herewith shown and described, is to be taken as a preferred example of the same, and that various changes in the shape, size and arrangement of parts, may be resorted to without departing from the spirit of my invention, or the scope of the subjoined claims.

Having thus described my invention, I claim:—

1. A ventilating device for a milk can, comprising a tubular body portion to be inserted within the neck of the milk can, said tubular body portion having ventilating openings formed in its side, and a separate circumferentially adjustable screen element removably mounted upon the exterior of said body portion to cover said openings.

2. A ventilating device for a milk can, comprising a tubular body portion to be inserted within the neck of the milk can, said tubular body portion having ventilating openings formed in its side, a flexible screen element removably mounted upon the exterior of said body portion to cover said openings, means detachably connecting the ends of the screen element and being longitudinally adjustable to circumferentially adjust the flexible screen element upon the tubular body portion, and a guard secured to the exterior of the body portion to cover said neck.

3. A ventilating device for a milk can, comprising a tubular body portion to be inserted within the neck of the milk can, said tubular body portion having ventilating openings formed in its side, a screen means covering the ventilating openings, a cover element for the tubular body portion and provided with a depending deflecting cone extending downwardly for substantially the vertical dimension of said ventilating openings, a guard carried by the cover element and projecting radially beyond the tubular body portion, and a guard carried by the tubular body portion and projecting radially beyond said neck.

4. A ventilating device for a milk can, comprising a tubular body portion to be inserted within the neck of the milk can, said tubular body portion having ventilating openings formed in its side, screen means covering the ventilating openings, a cover element removably mounted upon the tubular body portion, and a downwardly tapering ventilating cone secured to the cover element and extending downwardly for substantially the vertical dimension of said ventilating openings.

In testimony whereof I affix my signature.

LAWRENCE J. SCHUBERT.